July 8, 1969 YASUSHI HORI ET AL 3,454,731

SWITCHING MECHANISM OF AUTOMATICALLY RECIPROCATING TYPE MAGNETIC TAPE RECORDER WITH SELECTIVE INTERLOCKING BETWEEN CONTROL KNOB AND BUTTONS

Filed March 6, 1968 Sheet 1 of 2

United States Patent Office 3,454,731

Patented July 8, 1969

3,454,731

SWITCHING MECHANISM OF AUTOMATICALLY RECIPROCATING TYPE MAGNETIC TAPE RECORDER WITH SELECTIVE INTERLOCKING BETWEEN CONTROL KNOB AND BUTTONS

Yasushi Hori, Tokyo, and Hisao Kodama, Yokohama-shi, Japan, assignors to Tokyo Shibaura Electric Co., Ltd., Kawasaki-shi, Japan, a corporation of Japan Filed Mar. 6, 1968, Ser. No. 711,117

Claims priority, application Japan, Mar. 9, 1967, 42/14,408, 42/14,409

Int. Cl. H01h *9/20;* G11b *5/00*

U.S. Cl. 200—50 5 Claims

ABSTRACT OF THE DISCLOSURE

In an automatically reciprocating type magnetic tape recorder a switching mechanism is provided comprising an operating knob which selects forward and reverse runnings and stop, a locking plate actuated by the operating knob, a recording-reproducing circuit switching means arranged to be locked by the locking plate, a driving means responsive to a signal generated by the magnetic tape to automatically rotate the operating knob from its forward running position to its reverse running position through the stop position and means interlocked with the driving means to maintain the locking relation between the recording-reproducing circuit switching means and the locking plate.

*Background of the invention*

This invention relates to a switching mechanism for an automatically reciprocating type magnetic recorder.

In a prior automatically reciprocating type magnetic recorder, a mechanism for moving a magnetic tape in the forward direction and a mechanism for moving the magnetic tape in the reverse direction are switched by a single operating knob, or a push button.

In any case, the arrangement is such that, where it is desired to perform recording by moving the magnetic tape in the forward direction, at first a push button is depressed to switch the electric circuit from the reproducing circuit to the recording circuit and while maintaining this condition said operating knob or push button is operated to cause to operate the mechanism for moving the magnetic tape in the forward direction while at the same time to lock the push button for establishing the recording circuit.

In the case where it is desired to move the magnetic tape to some extent in the forward direction and then move it in the reverse direction to continue recording operation, if the operating knob is manipulated to operate the mechanism for moving magnetic tape in the reverse direction there would be an interval between forward and reverse operations in which the stopping mechanism is driven so that said push button that has established the recording circuit would be unlocked or released thus switching the recording circuit to the reproducing circuit.

For this reason, in the prior automatically reciprocating type magnetic recorder it is necessary to manually hold the push button adapted to establish the recording circuit during the entire period wherein the direction of movement of the magnetic tape is reversed when it is desired to reverse said direction of movement while the recorder is set for recording. Accordingly, if the operator fails to maintain the push button for establishing the recording circuit in its depressed condition and manipulates to move the magnetic tape in the reverse direction the recording circuit would be switched to the reproducing circuit.

*Summary of the invention*

An object of this invention is to provide a novel automatic switching mechanism for an automatically reciprocating type magnetic recorder capable of continuously maintaining a recordable condition throughout the forward and reverse runnings of a magnetic tape.

A further object of this invention is to provide a new and improved switching mechanism of simple construction for an automatically reciprocating type tape recorder.

Yet another object of this invention is to provide a switching mechanism for an automatically reciprocating type recorder, said switching mechanism being provided with a safety device which prevents damage to the mechanism during improper operation.

According to a preferred embodiment of this invention, these and other objects are attained by providing a switching mechanism of an automatically reciprocating type magnetic tape recorder comprising an operating knob which determines forward running, stop and reverse running of a magnetic tape; a movable locking plate connected to said operating knob; a recording-reproducing circuit switching means arranged to be locked by said locking plate to switch the electric circuit between a reproducing circuit and a recording circuit; means responsive to a signal from the magnetic tape to automatically rotate said operating knob from its forward running position to the reverse running position through the stop position; and means interlocked with said last mentioned means to maintain the locking condition between said recording-reproducing circuit switching means and said locking plate.

According to modified embodiments of this invention means are provided to prevent damage of the mechanism when it is improperly operated.

*Brief description of the drawings*

The invention can be more fully understood from the following detailed description when taken in connection with the accompanying drawings in which.

*Description of the preferred embodiments*

Figure 1:
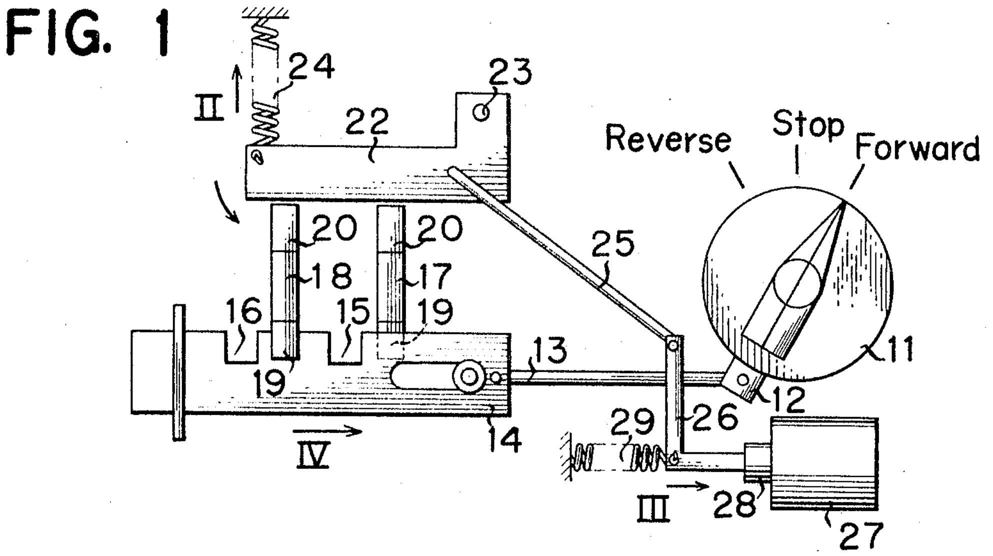
FIG. 1 is a plan view of one embodiment of this invention.

Referring now to FIG. 1 of the accompanying drawing there is shown an operating knob 11 for selecting the forward running and reverse running of a magnetic tape. The operating knob 11 is rotatably mounted on a base plate, not shown, and has three positions, i.e., a forward position for running the magnetic tape in the forward direction at which it also controls a mechanism for stopping the magnetic tape, a reverse position for running the magnetic tape in the reverse direction and a stop position intermediate said two positions. Accordingly, stop condition is always interposed between forward running and reverse running not only when the operating knob 11 is turned in the direction of forward running-stop-reverse running but also when it is turned in the opposite direction. A projection or tab 12 is secured to the periphery of the operating knob or coaxially therewith and one end of a first operating rod 13 is secured to the outer end of the projection 12. The junction between the operating rod 13 and the projection 12 is comprised by a pivotal connection so that the operating rod could reciprocate upon rotation of the operating knob 11.

The other end of the first operating rod 13 is pivotally connected to one end of a locking plate 14 to be described in detail hereinafter. The locking plate 14 is provided with notches 15 and 16 at one edge thereof and is mounted to be movable in the longitudinal direction as the first operating rod 13 is reciprocated. Parallel recording-reproducing circuit switching fingers 17 and 18 are provided adjacent the edge of the locking plate 14 including notches 15 and 16. The purpose of providing two switching fingers is to perform recording of stereo signals. These recording-reproducing circuit switching fingers are provided in the direction perpendicular to the longitudinal axis to the locking plate 14 and are movable in their longitudinal direction.

Figure 2:
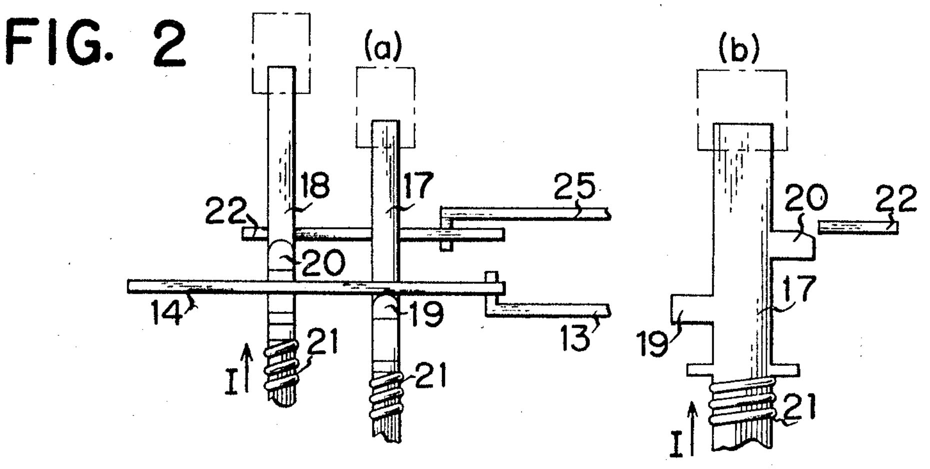
FIG. 2*a* is a front view of some essential components comprising the mechanism shown in FIG. 1.
FIG. 2*b* is a side elevation of the components shown in FIG. 2*a*.

As best shown in FIG. 2*b*, a projection 19 is provided on one side edge of each of said switching fingers 17 and 18 facing to the locking plate 14 and another projection 20 is provided on the other side edge. The projection 19 extends beyond the side edge of the locking plate 14 and has a length shorter than the lateral length of the notches 15 and 16. A coil spring 21 is loosely mounted on the base portion of each of the switching fingers 17 and 18 to normally bias them in one direction (in the direction of an arrow I as shown in FIGS. 2*a* and 2*b*). A recording circuit holding plate 22 is provided to face the side edge of the recording-reproducing circuit switching fingers 17 and 18 opposite the side edge that faces to the locking plate 14, or the edge provided with the projection 20. Similar to the locking plate 14, this recording circuit holding plate 22 also extends in the direction perpendicular to the longitudinal axes of the recording-reproducing switching fingers 17 and 18 and is pivotally mounted on a pivot pin 23 at one end thereof. The holding plate 22 is normally pulled in a definite direction (in the direction of an arrow II in FIG. 1) by a resilient means, such as spring 24, connected to the other end. One end of a second operating rod 25 is connected to a point of the holding plate intermediate the pivot pin 23 and the point to which the spring 24 is connected, the opposite end of the second operating lever 25 being connected to one end of a driving lever 26. It is to be understood that opposite ends of the second operating lever 25 are pivotally connected to the holding plate 22 and the driving lever 26, respectively. The other arm of the driving lever 26 is bent at right angles and is connected to a plunger 28 of a solenoid coil 27. The knee of driving lever 26 is connected to one end of a spring 29 which functions to pull the driving lever 26 to align said other arm thereof with the plunger 28. The solenoid coil 27 is connected to be energized at the point of switching of the reciprocating motion of the magnetic tape and is arranged such that it will be operated when the operating knob is moved or turned from the forward running position to the reverse running position through the stop position or vice versa. Although not shown in the drawing, one end of said recording-reproducing circuit switching fingers 17 and 18 are connected to switches comprised by slide switches and the like for effecting switching between recording and reproducing circuits.

The operation of the above described is as follows: In the condition shown in the drawing, the operating knob 11 is in its forward running position and the recording-reproducing circuit switching finger 17 is in a locking engagement with the locking plate 14. The latter expression means that a recording electric circuit is closed. In a magnetic recorder the magnetic tape is constructed to generate, after a predetermined length thereof has been fed through the recorder, a suitable signal to energize the solenoid coil 27 to attract the plunger 28 in the direction of arrow III. Then the driven member 26 will also be pulled towards the right to touch with the projection 12 to turn the operating knob 11 in the counter-clockwise direction through the stop position. At this time, the movement of the first operating rod 13 would otherwise move the locking plate 14 in the direction shown by arrow IV thus moving the notch 15 thereof to a position in alignment with the recording-reproducing switching finger 17 to unlock it to switch the electric circuit to the reproducing circuit. However, simultaneously with the turning of the operating knob 11 by the driving member, the recording circuit holding plate 22 will be rotated in the counter-clockwise direction around the pivot 23 through the second operating rod 25 against the tension of the spring 24 so that the lower side edge of the holding plate 22 will be urged against the upper edge of the projection 20 of the switching finger 17 thus preventing it from being released. For this reason, even when the operating knob 13 is in the stop position the recording circuit will be maintained in its "on" condition. As the operating knob 11 is further rotated to reach the reverse running position, the holding plate 22 will be pressed downwardly further, the notch 15 of the locking plate will be moved out of alignment with the switching finger 17, thus releasing the same. As a consequence, even when the driving lever 26 is restored to the original position by the tension of the spring 29 it becomes possible to continuously maintain the recording condition as long as the recording tape is automatically reciprocated.

Although in the illustrated embodiment, a solenoid coil was used for switching the direction of running of the tape, it is to be understood that this invention is not limited to this particular arrangement but any suitable power means could be employed.

Further, in the above embodiments, while no consideration has been paid for improper operation of the apparatus the following embodiments incorporate such protection for the mechanism at the time of improper operation of the apparatus. However, actually, this problem is not so critical.

Figure 3:
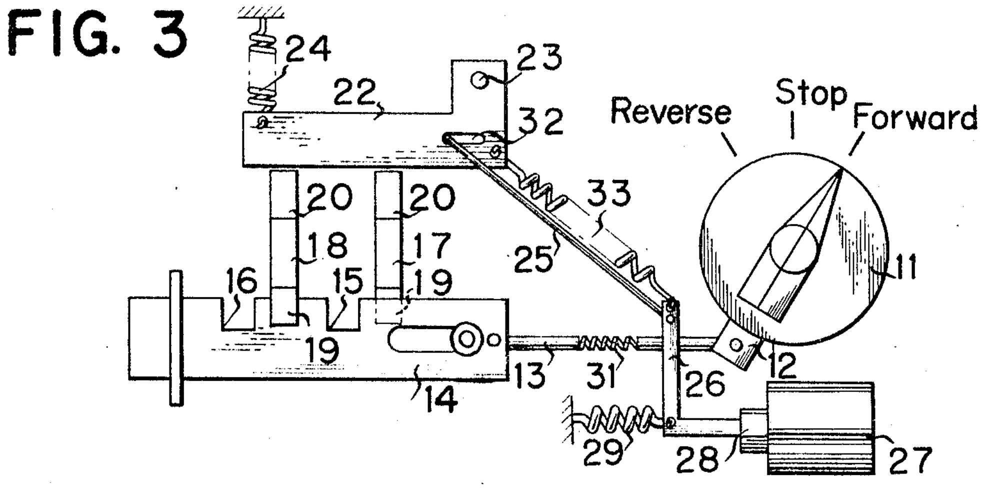
FIG. 3 is a plan view of another modification of this invention.

FIG. 3 illustrates such a modified embodiment. In order to avoid duplicate description, elements corresponding to those shown in FIG. 1 are designated with the same reference nunmerals. As shown, a coil spring 31 is interposed in the intermediate portion of the first operating rod 13 which interconnects the projection 12 provided on the periphery of the operating knob 11 or coaxially therewith and the locking plate 14. Further the upper end of the second operating rod 25 is connected to the recording circuit holding plate 22 through a longitudinal slot 32 and a spring 33 is interposed between the drivig lever 26 and the recording circuit holding plate 22. With this construction, when it is desired to switch from the stop condition to the recording condition shown in FIG. 3 for example, the recording-reproducing switching finger 17 is depressed against the tension of the spring 21 (FIG. 2*a*) and while the switching finger is maintained in this state, the operating knob 11 is rotated from the stop position to the forward running position. Then the locking plate 14 is moved to the left to lock the switching finger 17 thus establishing the recording condition. In the above operation, if the operating knob 11 were rotated without sufficiently depressing the recording-reproducing finger 17, the projection 19 provided on the side edge of the switching finger 17 adjacent to the locking plate would engage the notch 15 thereof thus preventing the rotation of the operating knob 11. If the operator tries to forcibly rotate the operating knob under this condition, the result would be the damage of the mechanism. However, this embodiment can avoid such damage by the cushioning action of the spring 31 interposed in the intermediate section of the first operating lever 13. In this case, the apparatus will not be operated. However, the desired operation can be completed by recycling the operation after restoring the components to the original state. The spring 33 provided between the driving lever 26 and the recording circuit holding plate 22 also prevents the damage of the mechanism. However, in this case, the lower edge of the recording circuit holding plate 22 will come to engage the projection 20 of the recording-reproducing switching finger 17 thus preventing the rotation of the recording circuit holding plate 22. If the driving lever 26 further pulls the recording circuit holding plate 22 under this circumstance, the mechanism would normally be damaged. However, under this condition, the upper end of the second operating lever 25 will slide in the slot 32 of the recording circuit holding plate 22 thus permitting the movement of the driving lever 26 without causing the rotary movement of the recording circuit holding plate 22. Under normal operating conditions, the spring 33 interposed between the recording circuit holding plate 22 and the driving lever 26 will impart a certain degree of rotary movement to the recording circuit holding plate 22 so that the movement of the driving lever 26 will not cause the second operating lever 25 to move along the slot 32, thus rotating the recording circuit holding plate 22 against the tension of the spring 24. Thus, this modification provides the protection for the mechanism of the apparatus.

Figure 4:
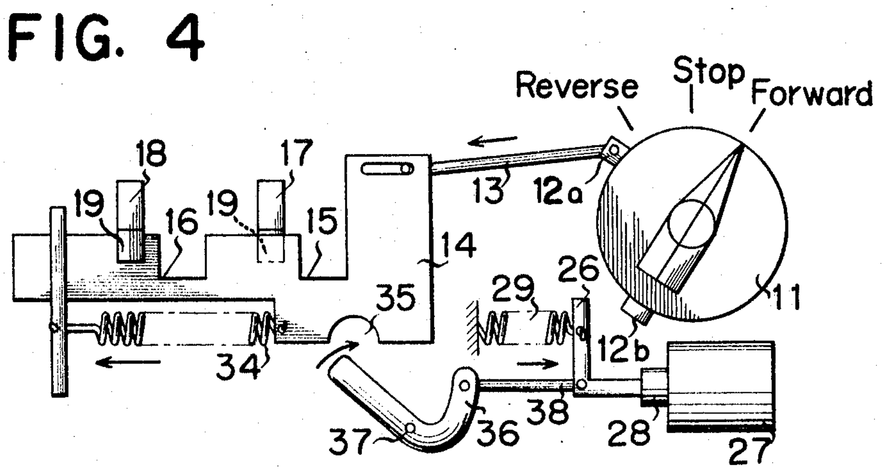
FIG. 4 shows a plan view of another modification of this invention.

FIG. 4 illustrates still another modification of this invention having the most simple construction.

As shown a first projection **12*a* and a second projection 12*b* are provided on the periphery of the operating knob 11. The first projection 12*a*** is connected to one end of the first operating lever 13, the other end thereof being connected to one end of the locking plate 14 through a pin and slot connection. Thus, the operating lever is reciprocated in the longitudinal direction as the operating knob 11 is rotated. The locking plate 14 is disposed to be movable in the longitudinal direction and is normally biased in the direction shown by an arrow by a spring 34.

One side edge of the locking plate 14 is formed with two spaced apart notches 15 and 16, and another notch 35 is provided in the other side edge. Similar to the previous embodiments each of the recording-reproducing switching plates 17 and 18 is provided with a projection 20.

The notch 35 provided on the lower edge of the locking plate 14 is arranged to receive one end of a recording circuit holding plate 36 which has a configuration of a bell crank pivoted at its center 37. The other end of the recording circuit holding plate 36 is connected to the knee of an L-shaped driving lever 26 through a connecting rod 38, one leg of the driving lever 26 extending to cooperate with the projection **12*b*** of the operating knob while the other leg being connected in the plunger 28 of the solenoid coil 27.

The solenoid coil 27 is energized when the magnetic tape automatically reverses its direction of running. As has been mentioned hereinbefore, the reason that two recording-reproducing circuit switching fingers 17 and 18 are provided is to record stereo-signals so that where it is desired to record monaural signals either one of them may be omitted. Although not shown, these fingers are connected to suitable recording-reproducing switching switches in the form of slide switches, for example.

The operation of this embodiment is as follows:

In the condition shown in FIG. 4 the operating knob 11 is shown in its forward position to drive the magnetic tape in the forward direction. The recording-reproducing circuit switching finger 17 is locked in the recording condition by the locking plate 14. Starting from this condition when a predetermined length of the magnetic tape has been passed, the solenoid coil 27 will be energized to attract the driving lever 26 towards the right to rotate the operating knob in the counterclockwise direction by the engagement between the projection **12*b*** and the driving lever.

This counterclockwise rotation of the operating knob 11 from the forward position moves the operating rod connected to its first projection **12*a*** in the direction indicated by an arrow to tend to move the locking lever 14 in the same direction. At this time, however, as one end of the crank lever 36 is held in engagement with the notch 35 by the operation of the solenoid coil 27, the locking plate 14 will not be moved to the left by said movement of the operating rod 13. As a consequence, the recording-reproducing circuit switching finger 17 is maintained in locking engagement with the notch 35 thus holding the recording circuit. As the operating knob 11 is further rotated to the reverse position the operating rod 13 will then be moved in the same direction as before so that the recording-reproducing circuit switching finger 17 will be still maintained in the locking engagement with the locking plate 14.

Figure 5:
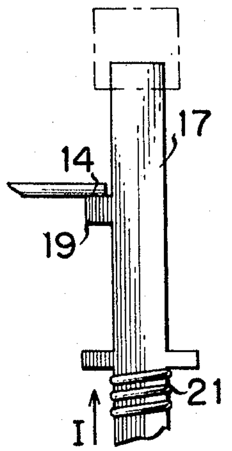
FIG. 5 shows a side elevation of some essential components of the embodiment shown in FIG. 4.

Thus, since the recording circuit is continuously held closed regardless of the automatic reversal of the direction of running of the magnetic tape, recording can be made during forward running as well as reverse runing of the magnetic tape. When the operating knob 11 is manually rotated from the position shown in FIG. 4 to the stop position, the locking plate 14 which has been pulled to the right by the operating lever 13 will be released so that the locking plate 14 will be moved in the direction indicated by the arrow under the bias of spring 34. This movement of the locking plate 14 will bring the notch 15 in alignment with the switching finger 17. Then the projection 19 of the swiching finger 17 which has been locked by the lower surface of the locking plate 14 will be released and the switching finger 17 will be pushed up by a spring associated with its base portion as shown in FIG. 5. Thus, the running of the magnetic tape is stopped while at the same time recording circuit is switched to the reproducing circuit.

While in the above description, the operation of only the right hand recording-reproducing circuit switching finger 17 has been described it is to be understood that the left hand switching finger 18 operates in the same manner. However, in this case, the switching finger 17 is not depressed and the established electric circuit is the reproducing circuit.

From the foregoing description it can be clearly understood that this invention provides a novel switching mechanism for an automatically reciprocating type magnetic tape recorder which can continuously maintain the recording condition not only during forward running but also during reverse running of the magnetic tape, can prevent damage to the mechanism due to improper operation thereof, has a simple construction and is easy to manipulate.

While the invention has been explained by describing particular embodiments thereof, it will be apparent that improvements and modifications may be made without departing from the scope of the invention.

What is claimed is:

1. A switching mechanism of an automatically reciprocating type magnetic tape recorder comprising an operating knob which determines forward running, stop and reverse running of a magnetic tape; a movable locking plate connected to said operating knob; a recording-reproducing circuit switching means arranged to be locked by said locking plate to switch the electric circuit between a reproducing circuit and a recording circuit means; means responsive to a signal from said magnetic tape to automatically rotate said operating knob from its forward running position to the reverse running position through the stop position; and means interlocked with said last mentioned means to maintain the locking condition between said recording-reproducing circuit switching means and said locking plate.

2. A switching mechanism of an automatically reciprocating type magnetic tape recorder comprising an operating knob which determines forward running, stopping and reverse running of a magnetic tape; a first operating rod with one end pivotally connected to said operating knob; a movable locking plate pivotally connected to the other end of said first operating rod; a recording-reproducing circuit switching member adapted to be locked by said locking plate to switch the electric circuit from the reproducing circuit to the recording circuit, a driving means responsive to a signal generated by said magnetic tape to automatically rotate said operating knob from its forward running position to the reverse running position through a stop position; a second operating rod with its one end pivotally connected to said driving means; and a locking condition holding means pivotally connected to the other end of said second operating rod to maintain said recording-reproducing circuit switching member in the locked position.

3. A switching mechanism of an automatic reciprocating type magnetic tape recorder according to claim 2 wherein a resilient member is interposed at an intermediate portion of said first operating rod.

4. A switching mechanism of an automatically reciprocating type magnetic tape recorder according to claim 2 wherein a tension spring is interposed between said driving means and said locking condition holding means and said second operating rod is connected to said locking condition holding means through a slot connection.

5. A switching mechanism of an automatically reciprocating type magnetic tape recorder comprising an operating knob which determines the forward runing, stop and reverse running of a magnetic tape; a first operating rod with its one end pivotally connected to said operating knob; a locking plate pivotally connected to the other end of said first operating rod, said locking plate being supported to move freely and being normally biased in one direction by means of a resilient means; a recording-reproducing circuit switching member arranged to be locked by said locking plate to switch the electric circuit from the reproducing circuit to the recording circuit; a driving means responsive to a signal generated by said magnetic tape to automatically rotate said operating knob from its forward running position to the reverse running position through the stop position; a second operating rod with its one end pivotally connected to said driving means; and means pivotally connected to the other end of said second operating rod to prevent said locking plate from moving and to maintain said recording-reproducing circuit switching member and said locking plate in their locked condition.

References Cited

UNITED STATES PATENTS

| | | | |
|---|---|---|---|
| 2,843,686 | 7/1958 | Ballou | 200—50.3 |
| 2,866,865 | 12/1958 | Durant. | |
| 2,878,601 | 3/1959 | Burmeister et al. | 74—483 X |
| 3,319,483 | 5/1967 | Ratter et al. | 74—483 |
| 3,366,342 | 1/1968 | Nieland et al. | 74—483 X |
| 3,398,329 | 8/1968 | Cataldo et al. | 317—136 |
| 3,179,753 | 4/1965 | Pollaschek. | |

ROBERT K. SCHAEFER, *Primary Examiner.*

ROBERT A. VANDERHYE, *Assistant Examiner.*

U.S. Cl. X.R.

74—483; 179—100.2; 317—136